US012791312B2

(12) United States Patent
Qin et al.

(10) Patent No.: US 12,791,312 B2
(45) Date of Patent: Nov. 10, 2026

(54) METHOD AND DEVICE FOR EVALUATING DAMAGE CAUSED BY SECONDARY STRESS TO VACUUM VESSEL, TERMINAL DEVICE, AND MEDIUM

(71) Applicant: Hefei Institute of Physical Science, Chinese Academy of Sciences, Hefei (CN)

(72) Inventors: Shijun Qin, Hefei (CN); Jinxing Zheng, Hefei (CN); Yuntao Song, Hefei (CN); Kun Lu, Hefei (CN); Zhihong Liu, Hefei (CN); Qingfeng Wang, Hefei (CN); Chengfeng Lin, Hefei (CN)

(73) Assignee: Hefei Institute of Physical Science, Chinese Academy of Sciences, Hefei (CN)

( * ) Notice: Subject to any disclaimer, the term of this patent is extended or adjusted under 35 U.S.C. 154(b) by 430 days.

(21) Appl. No.: 18/372,093

(22) Filed: Sep. 23, 2023

(65) Prior Publication Data

US 2024/0112823 A1 Apr. 4, 2024

(30) Foreign Application Priority Data

Sep. 23, 2022 (CN) ......................... 202211161520.1

(51) Int. Cl.
*G01B 21/32* (2006.01)

(52) U.S. Cl.
CPC .................................... *G01B 21/32* (2013.01)

(58) Field of Classification Search
CPC ........... G01B 21/32; G21B 1/057; G21B 1/17
See application file for complete search history.

(56) References Cited

FOREIGN PATENT DOCUMENTS

| | | | | |
|---|---|---|---|---|
| CN | 108959766 A | * | 12/2018 | ............. G06F 30/23 |
| CN | 109284570 A | * | 1/2019 | ............. G06F 30/17 |

OTHER PUBLICATIONS

Chen Zhu, Development of Design module of CFETR Vacuum Vessel, Feb. 15, 2018, pp. 17-29, 63-65 and 69.

* cited by examiner

*Primary Examiner* — Lam S Nguyen

(57) ABSTRACT

Disclosed are a method and device for evaluating damage caused by secondary stress to a vacuum vessel, a terminal device, and a medium, to perform following steps: obtaining secondary stress of a vacuum vessel that passes a primary-stress failure evaluation; obtaining structural damage parameters of the vacuum vessel when determining, based on evaluation parameters for the primary-stress failure evaluation of the vacuum vessel and the obtained secondary stress, that the vacuum vessel meets a precondition for a progressive deformation; and determining, based on the obtained structural damage parameters, whether the vacuum vessel meeting the precondition for the progressive deformation experiences structural damage due to the progressive deformation. In this way, a vacuum vessel of a nuclear fusion reactor can be evaluated based on damage caused by the secondary stress.

11 Claims, 2 Drawing Sheets

METHOD AND DEVICE FOR EVALUATING DAMAGE CAUSED BY SECONDARY STRESS TO VACUUM VESSEL, TERMINAL DEVICE, AND MEDIUM

CROSS REFERENCE TO RELATED APPLICATIONS

The present application claims the benefit of Chinese Patent Application No. 202211161520.1 filed on Sep. 23, 2022, the contents of which are incorporated herein by reference in their entirety.

TECHNICAL FIELD

The present disclosure relates to the technical field of analysis and evaluation on nuclear fusion devices, and in particular, to a method for evaluating damage caused by secondary stress to a vacuum vessel.

BACKGROUND

A vacuum vessel of a nuclear fusion reactor is a component encircled and surrounded by plasmas, and is located between a magnet and a thermal shield. A main body of the vacuum vessel is of a double-layer structure with a D-shaped ring section, serving as a support component for a blanket, a divertor, an in-vessel coil, and a port plug. As one of the key components of a nuclear fusion device, the vacuum vessel is a permanent component. The vacuum vessel is used to provide an ultra-high vacuum operating environment for a thermonuclear fusion reaction, transfer decay heat accumulated on the vacuum vessel and its in-vessel component during the fusion reaction, provide support for the in-vessel component, and bear load in other abnormal working conditions such as a plasma disruption event or a vertical displacement event. The vacuum vessel has a complex operating condition and an extremely high load-bearing requirement. In order to ensure safe and stable operation of the vacuum vessel, it is necessary to evaluate safety performance of the vacuum vessel.

By assuming that the vacuum vessel is made from an ideal elastic material, considering that the material has sufficient ductility, and neglecting impacts of secondary stress and peak stress, a conventional safety performance evaluation method for the vacuum vessel of the nuclear fusion reactor simplifies analysis and only evaluates a destructive effect of primary stress on a structure of the vacuum vessel.

However, a Tokamak experimental reactor will generate a high-energy 14 MeV neutron in a future nuclear fusion reaction, and neutron irradiation will decrease the material ductility of the vacuum vessel. In addition, when a vacuum vessel of a future nuclear fusion reactor is in a relatively low-temperature environment of 100° C., slight creeping will occur. During actual operation of the vacuum vessel, there is a high probability that the secondary stress causes permanent and irreversible damage to the structure of the vacuum vessel. However, the prior art is unable to evaluate and calculate the secondary stress on the vacuum vessel.

SUMMARY

In order to resolve the above problems, the present disclosure provides a method for evaluating damage caused by secondary stress to a vacuum vessel, to evaluate a vacuum vessel of a nuclear fusion reactor based on damage caused by secondary stress.

An embodiment of the present disclosure provides a method for evaluating damage caused by secondary stress to a vacuum vessel, including:

obtaining secondary stress of a vacuum vessel that passes a primary-stress failure evaluation;

obtaining structural damage parameters of the vacuum vessel when determining, based on evaluation parameters for the primary-stress failure evaluation of the vacuum vessel and the obtained secondary stress, that the vacuum vessel meets a precondition for a progressive deformation; and determining, based on the obtained structural damage parameters, whether the vacuum vessel meeting the precondition for the progressive deformation experiences structural damage due to the progressive deformation.

As an improvement to the above solution, a process of the primary-stress failure evaluation specifically includes:

obtaining preset allowable stress, and detecting general primary membrane stress, local primary membrane stress, and primary bending stress on the vacuum vessel as the evaluation parameters for the primary-stress failure evaluation;

determining whether the general primary membrane stress is greater than the allowable stress, and determining whether a sum of the local primary membrane stress and the primary bending stress is greater than a product of the allowable stress and a preset first threshold; and when the general primary membrane stress is not greater than the allowable stress, and the sum of the local primary membrane stress and the primary bending stress is not greater than the product of the allowable stress and the first threshold, determining that the vacuum vessel passes the primary-stress failure evaluation; or when the general primary membrane stress is greater than the allowable stress, or the sum of the local primary membrane stress and the primary bending stress is greater than the product of the allowable stress and the first threshold, determining that the vacuum vessel does not pass the primary-stress failure evaluation.

Preferably, the obtaining structural damage parameters of the vacuum vessel when determining, based on evaluation parameters for the primary-stress failure evaluation of the vacuum vessel and the obtained secondary stress, that the vacuum vessel meets a precondition for a progressive deformation specifically includes:

when $\text{Max}\ (P_L+P_b)+\Delta Q>3S_m$, determining that the vacuum vessel meets the precondition for the progressive deformation, and obtaining the structural damage parameters of the vacuum vessel, where the $P_L$ represents the local primary membrane stress on the vacuum vessel, the $P_b$ represents the primary bending stress on the vacuum vessel, the $S_m$ represents the preset allowable stress on the vacuum vessel, and the $\Delta Q$ represents the secondary stress on the vacuum vessel.

Further, the structural damage parameters include: an obtained material working temperature, calculated local plastic strain, a true strain value of an entire operating cycle of a Tokamak device, and a preset safety factor in elastic-plastic analysis.

As an improvement to the above solution, the determining, based on the obtained structural damage parameters, whether the vacuum vessel meeting the precondition for the progressive deformation experiences structural damage due to the progressive deformation specifically includes:

when $\varepsilon_{pl} \le \min[0.05, \lambda\varepsilon_{tr}]$, determining that the vacuum vessel does not experience the structural damage due to the progressive deformation; or when $\varepsilon_{pl} > \min[0.05, \lambda\varepsilon_{tr}]$, determining that the vacuum vessel experiences the structural damage due to the progressive deformation, where the true strain value of the entire operating cycle of the Tokamak device in the vacuum vessel is obtained according to a following formula:

$$\varepsilon_{tr} = \ln\frac{100}{100 - \%RA},$$

where the $\varepsilon_{pl}$ represents the local plastic strain of the vacuum vessel; the $\lambda$ represents the safety factor in the elastic-plastic analysis of the vacuum vessel; and a percentage of reduced cross-sectional area in a uniaxial test of the vacuum vessel is calculated according to a following formula: $\% RA = 71.8 - 4.34\times10^{-2}T - 6.47\times10^{-6}T^2$, where the T represents the material working temperature of the vacuum vessel.

Preferably, the method further includes:

obtaining a material strain-fatigue life curve corresponding to a material of the vacuum vessel by querying a preset database based on the material of the vacuum vessel, where the database includes a one-to-one correspondence between each material and a material strain-fatigue life curve;

calculating a strain range parameter of the vacuum vessel to determine a strain change range of the vacuum vessel, and comparing the strain change range and the material strain-fatigue life curve to determine a fatigue life of the vacuum vessel; and obtaining an actual quantity of operating times of the vacuum vessel, and when a ratio of the fatigue life of the vacuum vessel to the actual quantity of operating times is greater than a preset second threshold, determining that a fatigue failure occurs on the vacuum vessel.

As an improvement to the above solution, the strain change range is calculated according to a following formula: $\Delta\varepsilon = \Delta\varepsilon_1 + \Delta\varepsilon_2 + \Delta\varepsilon_3 + \Delta\varepsilon_4$, where the $\Delta\varepsilon 1$ represents an elastic term, and may be obtained from elastic total stress, the $\Delta\varepsilon 2$ represents a plastic increase due to a primary stress range at a point examined, the $\Delta\varepsilon 3$ represents intersection of the Neuber hyperbola (points of constant work per volume unit), and the $\Delta\varepsilon 4$ represents a plastic increase due to triaxiality.

Another embodiment the present disclosure provides a device for evaluating damage caused by secondary stress to a vacuum vessel, including:

an obtaining module configured to obtain secondary stress of a vacuum vessel that passes a primary-stress failure evaluation;

a progressive deformation evaluation module configured to obtain structural damage parameters of the vacuum vessel when determining, based on evaluation parameters for the primary-stress failure evaluation of the vacuum vessel and the obtained secondary stress, that the vacuum vessel meets a precondition for a progressive deformation; and a structural damage evaluation module configured to determine, based on the obtained structural damage parameters, whether the vacuum vessel meeting the precondition for the progressive deformation experiences structural damage due to the progressive deformation.

Preferably, the obtaining module is specifically configured to:

obtain preset allowable stress, and detect general primary membrane stress, local primary membrane stress, and primary bending stress on the vacuum vessel as the evaluation parameters for the primary-stress failure evaluation;

determine whether the general primary membrane stress is greater than the allowable stress, and determine whether a sum of the local primary membrane stress and the primary bending stress is greater than a product of the allowable stress and a preset first threshold; and when the general primary membrane stress is not greater than the allowable stress, and the sum of the local primary membrane stress and the primary bending stress is not greater than the product of the allowable stress and the first threshold, determine that the vacuum vessel passes the primary-stress failure evaluation; or when the general primary membrane stress is greater than the allowable stress, or the sum of the local primary membrane stress and the primary bending stress is greater than the product of the allowable stress and the first threshold, determine that the vacuum vessel does not pass the primary-stress failure evaluation.

Preferably, the progressive deformation evaluation module is specifically configured to:

when $\mathrm{Max}\,(P_L+P_b)+\Delta Q>3S_m$, determine that the vacuum vessel meets the precondition for the progressive deformation, and obtain the structural damage parameters of the vacuum vessel, where the $P_L$ represents the local primary membrane stress on the vacuum vessel, the $P_b$ represents the primary bending stress on the vacuum vessel, the $S_m$ represents the preset allowable stress on the vacuum vessel, and the $\Delta Q$ represents the secondary stress on the vacuum vessel.

Further, the structural damage parameters include: an obtained material working temperature, calculated local plastic strain, a true strain value of an entire operating cycle of a Tokamak device, and a preset safety factor in elastic-plastic analysis.

As an improvement to the above solution, the structural damage evaluation module is specifically configured to:

when $\varepsilon_{pl\le min}[0.05, \lambda\varepsilon_{tr}]$, determine that the vacuum vessel does not experience the structural damage due to the progressive deformation; or when $\varepsilon_{pl} > \min[0.05, \lambda\varepsilon_{tr}]$, determine that the vacuum vessel experiences the structural damage due to the progressive deformation, where the true strain value of the entire operating cycle of the Tokamak device in the vacuum vessel is obtained according to a following formula:

$$\varepsilon_{tr} = \ln\frac{100}{100 - \%RA},$$

where the $\varepsilon_{pl}$ represents the local plastic strain of the vacuum vessel; the $\lambda$ represents the safety factor in the elastic-plastic analysis of the vacuum vessel; and a percentage of reduced cross-sectional area in a uniaxial test of the vacuum vessel is calculated according to a following formula: % $RA=71.8-4.34\times10^{-2}T-6.47\times10^{-6}T^2$, where the T represents the material working temperature of the vacuum vessel.

Preferably, the device further includes a fatigue failure evaluation module, which is specifically configured to:

obtain a material strain-fatigue life curve corresponding to a material of the vacuum vessel by querying a preset database based on the material of the vacuum vessel, where the database includes a one-to-one correspondence between each material and a material strain-fatigue life curve;

calculate a strain range parameter of the vacuum vessel to determine a strain change range of the vacuum vessel, and compare the strain change range and the material strain-fatigue life curve to determine a fatigue life of the vacuum vessel; and obtain an actual quantity of operating times of the vacuum vessel, and when a ratio of the fatigue life of the vacuum vessel to the actual quantity of operating times is greater than a preset second threshold, determine that a fatigue failure occurs on the vacuum vessel.

Further, the strain change range is calculated according to a following formula: $\Delta\varepsilon=\Delta\varepsilon_1+\Delta\varepsilon_2+\Delta\varepsilon_3+\Delta\varepsilon_4$, where the $\Delta\varepsilon_1$ represents an elastic term, and may be obtained from elastic total stress, the $\Delta\varepsilon_2$ represents a plastic increase due to a primary stress range at a point examined, the $\Delta\varepsilon_3$ represents intersection of the Neuber hyperbola (points of constant work per volume unit), and the $\Delta\varepsilon_4$ represents a plastic increase due to triaxiality.

Still another embodiment of the present disclosure provides a terminal device, including a processor, a memory, and a computer program stored in the memory and configured to be executed by the processor, where the processor executes the computer program to implement the method for evaluating damage caused by secondary stress to a vacuum vessel in any one of the above embodiments.

Yet another embodiment of the present disclosure provides a computer-readable storage medium. The computer-readable storage medium includes a stored computer program, and the computer program is run to control a device on which the computer-readable storage medium is located to perform the method for evaluating damage caused by secondary stress to a vacuum vessel in any one of the above embodiments.

The present disclosure provides a method and device for evaluating damage caused by secondary stress to a vacuum vessel, a terminal device, and a medium, to perform following steps: obtaining secondary stress of a vacuum vessel that passes a primary-stress failure evaluation; obtaining structural damage parameters of the vacuum vessel when determining, based on evaluation parameters for the primary-stress failure evaluation of the vacuum vessel and the obtained secondary stress, that the vacuum vessel meets a precondition for a progressive deformation; and determining, based on the obtained structural damage parameters, whether the vacuum vessel meeting the precondition for the progressive deformation experiences structural damage due to the progressive deformation. In this way, a vacuum vessel of a nuclear fusion reactor can be evaluated based on damage caused by the secondary stress. An evaluation method based on the primary stress and the secondary stress is adopted to avoid a progressive deformation of a structure of the vacuum vessel. A complete method for evaluating integrity of the structure of the vacuum vessel is defined, which avoids a previous simple primary-stress analysis method that uses elastic limit load of the structure of the vacuum vessel as a strength index, achieves a more practical evaluation result, and ensures safety of the structure.

DETAILED DESCRIPTION

The technical solutions in the embodiments of the present disclosure are described clearly and completely below with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

Figure 1:
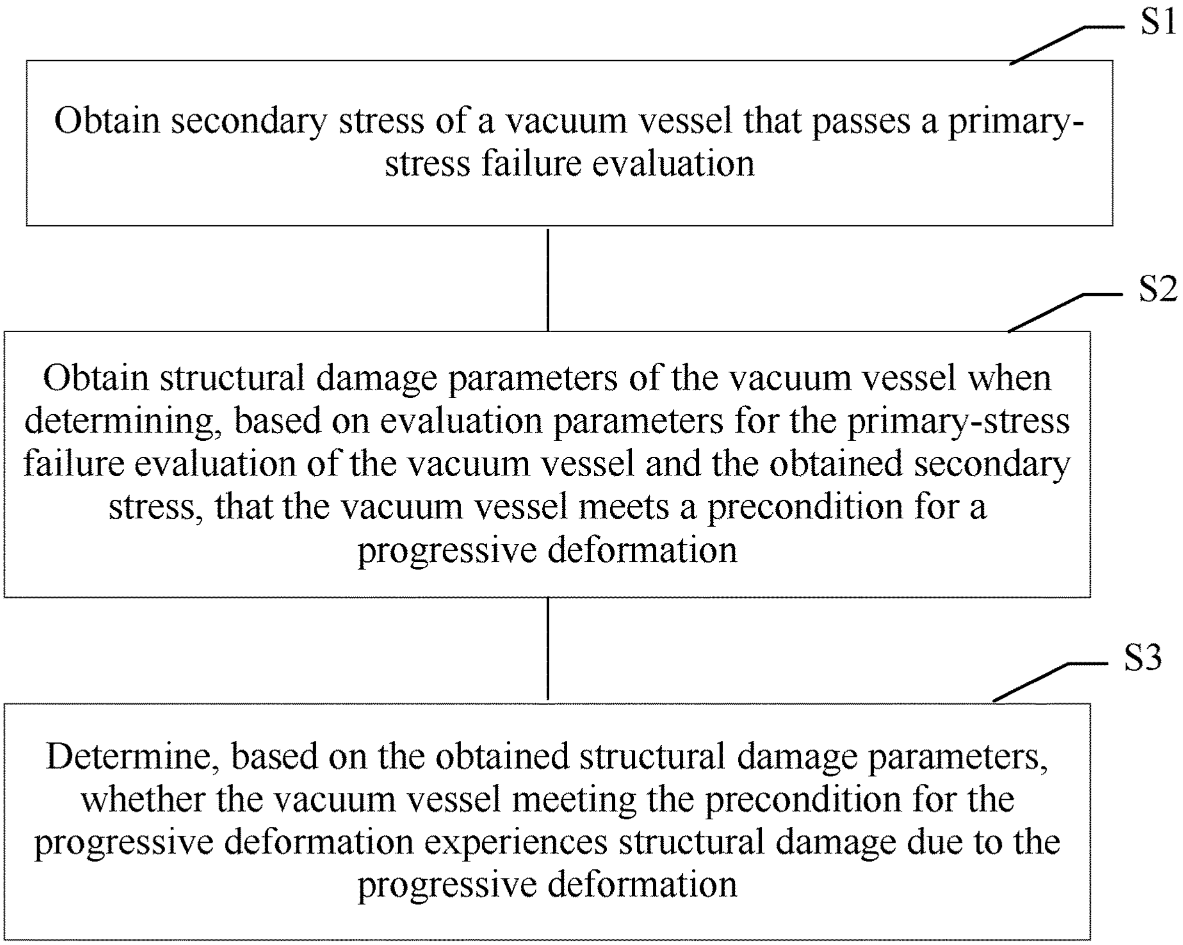
FIG. 1 is a schematic flowchart of a method for evaluating damage caused by secondary stress to a vacuum vessel according to an embodiment of the present disclosure.

FIG. 1 is a schematic flowchart of a method for evaluating damage caused by secondary stress to a vacuum vessel according to an embodiment of the present disclosure. The method includes steps S1 to S3.

S1: Obtain secondary stress of a vacuum vessel that passes a primary-stress failure evaluation.

S2: Obtain structural damage parameters of the vacuum vessel when determining, based on evaluation parameters for the primary-stress failure evaluation of the vacuum vessel and the obtained secondary stress, that the vacuum vessel meets a precondition for a progressive deformation.

S3: Determine, based on the obtained structural damage parameters, whether the vacuum vessel meeting the precondition for the progressive deformation experiences structural damage due to the progressive deformation.

In specific implementation of this embodiment, a failure evaluation is performed on the vacuum vessel based on primary stress to determine whether a primary evaluation on the vacuum vessel passes, in other words, whether the vacuum vessel experiences a primary-stress failure.

After it is determined through primary-stress evaluation that the vacuum vessel is structurally safe, it is determined that the primary-stress failure evaluation passes, and the secondary stress on the vacuum vessel is obtained to evaluate the secondary stress on the vacuum vessel.

When it is determined through the primary-stress evaluation that the vacuum vessel is structurally unsafe under the primary stress, there is no need to evaluate the secondary stress, and there is the structural damage to the vacuum vessel.

Whether the vacuum vessel meets the precondition for the progressive deformation is determined based on the obtained secondary stress and the evaluation parameters for the primary-stress failure evaluation. When the vacuum vessel is determined to meet the precondition for the progressive deformation, the structural damage parameters of the vacuum vessel are obtained to evaluate the structural damage due to the progressive deformation caused by the secondary stress on the vacuum vessel. When the vacuum vessel is determined to not meet the precondition for the progressive deformation, there is no need to evaluate the structural damage due to the progressive deformation.

Whether the vacuum vessel meeting the precondition for the progressive deformation experiences the structural damage due to the progressive deformation is determined based on the obtained structural damage parameters.

This embodiment considers that a high-energy neutron generated by a Tokamak experimental reactor in a future fusion reaction decreases material ductility. Therefore, an evaluation method based on the primary stress and the secondary stress is adopted to avoid a progressive deformation of a structure of the vacuum vessel. A complete method for evaluating integrity of the structure of the vacuum vessel is defined, which avoids a previous simple primary-stress analysis method that uses elastic limit load of the structure of the vacuum vessel as a strength index, achieves a more practical evaluation result, and ensures safety of the structure.

In another embodiment provided in the present disclosure, a process of the primary-stress failure evaluation specifically includes:

- obtaining preset allowable stress, and detecting general primary membrane stress, local primary membrane stress, and primary bending stress on the vacuum vessel as the evaluation parameters for the primary-stress failure evaluation;
- determining whether the general primary membrane stress is greater than the allowable stress, and determining whether a sum of the local primary membrane stress and the primary bending stress is greater than a product of the allowable stress and a preset first threshold; and
- when the general primary membrane stress is not greater than the allowable stress, and the sum of the local primary membrane stress and the primary bending stress is not greater than the product of the allowable stress and the first threshold, determining that the vacuum vessel passes the primary-stress failure evaluation; or
- when the general primary membrane stress is greater than the allowable stress, or the sum of the local primary membrane stress and the primary bending stress is greater than the product of the allowable stress and the first threshold, determining that the vacuum vessel does not pass the primary-stress failure evaluation.

In specific implementation of this embodiment, the preset allowable stress $S_m$ is obtained. The allowable stress corresponds to a material characteristic of the vacuum vessel, and has different values for vacuum vessels with different materials. A corresponding material is obtained from a calibration parameter of the vacuum vessel, and an allowable stress of the corresponding material is determined.

The general primary membrane stress $P_m$, the local primary membrane stress $P_L$, and the primary bending stress $P_b$ of the vacuum vessel are detected, and the obtained allowable stress, general primary membrane stress, local primary membrane stress, and primary bending stress are used as the evaluation parameters for the primary-stress failure evaluation.

In a standard, the local primary membrane stress is a total amount of membrane stress in a local stressed zone, which means that the general primary membrane stress $P_m$ in the local stressed zone is part of the local primary membrane stress $P_L$. The primary bending stress $P_b$ is bending stress linearly distributed along a thickness direction for balancing pressure or other mechanical load, such as bending stress at a center of a circumferentially simply supported circular plate subjected to lateral pressure.

The allowable stress $S_m$ is basic data in mechanical design and engineering structural design. In practical applications, a value of the allowable stress is a structural parameter generally specified by the national engineering regulatory department based on principles of safety and economy, as well as a material strength, load, an environmental condition, processing quality, calculation accuracy, and importance of a part or a component.

Whether the general primary membrane stress is greater than the allowable stress, and whether the sum of the local primary membrane stress and the primary bending stress is greater than the product of the allowable stress and the preset first threshold are determined, in other words, whether $P_m \le S_m$ and $P_L + P_b \le 1.5S_m$ are true is determined. The first threshold is set to 1.5.

When both $P_m < S_m$ and $P_L + P_b \le 1.5S_m$ are true, it is determined through the primary-stress evaluation that the vacuum vessel is structurally safe, and it is determined that the vacuum vessel passes the primary-stress failure evaluation.

When $P_m \le S_m$ or $P_L + P_b \le 1.5S_m$ is false, it is determined through the primary-stress evaluation that the vacuum vessel is structurally unsafe, and it is determined that the vacuum vessel does not pass the primary-stress failure evaluation.

When the vacuum vessel passes the primary-stress failure evaluation, the vacuum vessel undergoes a secondary-stress damage evaluation to determine damage due to the secondary stress on the vacuum vessel, which avoids a missed judgment of the primary stress. When the vacuum vessel does not pass the primary-stress failure evaluation, the vacuum vessel is directly determined to have structural damage. The evaluation method based on the primary stress and the secondary stress improves accuracy of a structural damage evaluation of the vacuum vessel.

In another embodiment provided in the present disclosure, the step S2 specifically includes:

- when Max $(P_L + P_b) + \Delta Q > 3S_m$, determining that the vacuum vessel meets the precondition for the progressive deformation, and obtaining the structural damage parameters of the vacuum vessel.

The $P_L$ represents the local primary membrane stress on the vacuum vessel, the $P_b$ represents the primary bending stress on the vacuum vessel, the $S_m$ represents the preset allowable stress on the vacuum vessel, and the $\Delta Q$ represents the secondary stress on the vacuum vessel.

In specific implementation of this embodiment, the precondition for the progressive deformation of the vacuum vessel is evaluated based on the obtained secondary stress $\Delta Q$ and the evaluation parameters for the primary-stress failure evaluation, namely, the general primary membrane stress $P_m$, the local primary membrane stress $P_L$, the primary bending stress $P_b$, and the allowable stress $S_m$.

The secondary stress $\Delta Q$ is normal stress or shear stress required to meet an external constraint or a continuous condition for structural deformation. The basic characteristic of the secondary stress is that it is self-limiting, which means that a constraint or a continuous condition that causes stress can be met through local yielding and a small amount of plastic deformation, thereby preventing the deformation from continuously increasing. Provided that no repeated loading is performed, no damage is caused, for example, when there is overall thermal stress or bending stress at a discontinuous position of the overall structure.

Whether $Max(P_L+P_b)+\Delta Q>3S_m$ is true is determined.

When $Max(P_L+P_b)+\Delta Q>3S_m$ is true, it is determined that the vacuum vessel meets the precondition for the progressive deformation, and the structural damage parameters of the vacuum vessel are obtained to evaluate the structural damage to the vacuum vessel.

Whether the vacuum vessel experiences the progressive deformation is evaluated as a precondition for determining the damage due to the progressive deformation, to ensure accuracy of determining the progressive deformation.

In another embodiment provided in the present disclosure, the structural damage parameters include: an obtained material working temperature, calculated local plastic strain, a true strain value of an entire operating cycle of a Tokamak device, and a preset safety factor in elastic-plastic analysis.

In specific implementation of this embodiment, the structural damage parameters for determining the structural damage due to the progressive deformation include the obtained material working temperature T, which is related to the material of the vacuum vessel.

The local plastic strain $\varepsilon_{pl}$ of the vacuum vessel, the true strain value $\varepsilon_{tr}$ of the entire operating cycle of the Tokamak device, and the preset safety factor $\lambda$ in the elastic-plastic analysis are calculated.

A fatigue fracture of any part starts from a position with maximum local strain in a strain concentration region, and a certain amount of plastic deformation occurs before crack initiation. The local plastic deformation is a prerequisite for initiation and propagation of a fatigue crack. Therefore, a fatigue strength and life of the part are determined by maximum local stress-strain in the strain concentration region.

The structural damage due to the progressive deformation is evaluated based on the obtained structural damage parameters.

In another embodiment provided in the present disclosure, the step S3 specifically includes:

when $\varepsilon_{pl}\leq\min[0.05,\lambda\varepsilon_{tr}]$, determining that the vacuum vessel does not experience the structural damage due to the progressive deformation; or when $\varepsilon_{pl}>\min[0.05,\lambda_{tr}]$, determining that the vacuum vessel experiences the structural damage due to the progressive deformation, where the true strain value of the entire operating cycle of the Tokamak device in the vacuum vessel is obtained according to a following formula:

$$\varepsilon_{tr} = \ln\frac{100}{100 - \%RA},$$

where the $\varepsilon_{pl}$ represents the local plastic strain of the vacuum vessel; the $\lambda$ represents the safety factor in the elastic-plastic analysis of the vacuum vessel; and a percentage of reduced cross-sectional area in a uniaxial test of the vacuum vessel is calculated according to a following formula: % RA=71.8−4.34×$10^{-2}$T−6.47×$10^{-6}T^2$, where the T represents the material working temperature of the vacuum vessel.

In specific implementation of this embodiment, the progressive deformation is a phenomenon that structural plastic deformation occurs and gradually accumulates under the joint action of cyclic stress and the primary stress. Therefore, when the structural damage due to the progressive deformation is determined, whether $\varepsilon_{pl}\leq\min[0.05,\lambda\varepsilon_{tr}]$ is true is determined, in other words, the local plastic strain $\varepsilon_{pl}$ of the vacuum vessel is compared with the smaller one of 0.05 and $\lambda\varepsilon_{tr}$. The $\varepsilon_{tr}$ represents the true strain value of the entire operation cycle of the Tokamak device in the vacuum vessel, and the $\lambda$ represents the safety factor in the elastic-plastic analysis of the vacuum vessel.

When the $\varepsilon_{pl}$ is less than or equal to the smaller one of 0.05 and the $\lambda\varepsilon_{tr}$, it is determined that the vacuum vessel does not experience the structural damage due to the progressive deformation.

When the $\varepsilon_{pl}$ is greater than the smaller one of 0.05 and the $\lambda\varepsilon_{tr}$, it is determined that the vacuum vessel experiences the structural damage due to the progressive deformation.

The true strain value of the entire operating cycle of the Tokamak device in the vacuum vessel is obtained according to the following formula:

$$\varepsilon_{tr} = \ln\frac{100}{100 - \%RA},$$

where the $\varepsilon_{pl}$ represents the local plastic strain of the vacuum vessel, and the $\lambda$ represents the safety factor in the elastic-plastic analysis of the vacuum vessel. The percentage of the reduced cross-sectional area in the uniaxial test of the vacuum vessel is calculated according to the following formula: % RA=71.8−4.34×$10^{-2}$T−6.47×$10^{-6}T^2$, where the T represents the material working temperature of the vacuum vessel.

The local plastic strain of the vacuum vessel is determined to determine whether the vacuum vessel experiences the structural damage due to the progressive deformation, thereby improving accuracy of a structural evaluation of the vacuum vessel.

In another embodiment provided in the present disclosure, a material strain-fatigue life curve corresponding to the material of the vacuum vessel is obtained by querying a preset database based on the material of the vacuum vessel. The database includes a one-to-one correspondence between each material and a material strain-fatigue life curve.

A strain range parameter of the vacuum vessel is calculated to determine a strain change range of the vacuum vessel, and the strain change range and the material strain-fatigue life curve are compared to determine a fatigue life of the vacuum vessel.

An actual quantity of operating times of the vacuum vessel is obtained, and when a ratio of the fatigue life of the vacuum vessel to the actual quantity of operating times is greater than a preset second threshold, it is determined that a fatigue failure occurs on the vacuum vessel.

In specific implementation of this embodiment, the material characteristic of the vacuum vessel is obtained, and the pre-established database including each material and the strain-fatigue life curve is queried to obtain the corresponding material strain-fatigue life curve of the material of the vacuum vessel.

A strain change parameter of the vacuum vessel is calculated, a strain change range of the vacuum vessel is determined based on the strain change parameter, and the strain change range and the material strain-fatigue life curve are compared to query a fatigue life that is of the vacuum vessel and corresponds to material strain in the curve. The fatigue life is a theoretical value corresponding to the material strain range.

The actual quantity of operating times of the vacuum vessel is obtained. When the ratio of the fatigue life of the vacuum vessel to the actual quantity of operating times is greater than the preset second threshold, in other words, when a deviation between the fatigue life and the actual quantity of operating times is greater than a preset deviation range of the preset second threshold, it is determined that the fatigue failure occurs on the vacuum vessel. The second threshold may be set to 0.8.

The fatigue failure of the material strain is evaluated to determine accuracy of the secondary-stress evaluation of the vacuum vessel and detect the fatigue failure of the material in time, thereby maintaining or replacing the vacuum vessel in time to improve operation safety.

In another embodiment provided in the present disclosure, a process of calculating the strain change range includes:

calculating the strain change range according to a following formula: $\Delta\varepsilon=\Delta\varepsilon_1+\Delta\varepsilon_2+\Delta\varepsilon_3+\Delta\varepsilon_4$, where the $\Delta\varepsilon_1$ represents an elastic term, and may be obtained from elastic total stress, the $\Delta\varepsilon_2$ represents a plastic increase due to a primary stress range at a point examined, the $\Delta\varepsilon_3$ represents intersection of the Neuber hyperbola (points of constant work per volume unit), and the $\Delta\varepsilon_4$ represents a plastic increase due to triaxiality.

In specific implementation of this embodiment, the strain range $\Delta\varepsilon_1$ caused by the elastic analysis, the plastic strain range $\Delta\varepsilon_2$ caused by the principal stress, the plastic strain range $\Delta\varepsilon_3$ caused by the plastic redistribution, and the plastic strain range $\Delta\varepsilon_4$ caused by the triaxial stress are obtained to calculate the strain change range.

The strain change range is calculated according to the following formula: $\Delta\varepsilon=\Delta\varepsilon_1+\Delta\varepsilon_2+\Delta\varepsilon_3+\Delta\varepsilon_4$, namely, $\overline{\Delta\varepsilon}=\overline{\Delta\varepsilon_1}+\overline{\Delta\varepsilon_2}+\overline{\Delta\varepsilon_3}+\overline{\Delta\varepsilon_4}$. A specific meaning and calculation method are as follows:

(1) The $\overline{\Delta\varepsilon_1}$ represents an elastic strain range.

This value corresponds to an elastic strain component, and can be directly calculated according to the Hooke's law. A calculation formula is:

$$\overline{\Delta\varepsilon_1}=\frac{2}{3}(1+v)\left(\frac{\overline{\Delta\sigma_{tot}}}{E}\right)$$

where the v represents a Poisson's ratio of the material of the vacuum vessel, the $\overline{\Delta\sigma_{tot}}$ represents the stress range obtained through the elastic analysis, and the E represents an elastic modulus of the material of the vacuum vessel.

(2) The $\overline{\Delta\varepsilon_2}$ represents a primary-stress plastic strain range.

This value corresponds to a plastic strain component caused by the primary stress, and is calculated according to a following formula:

$$\overline{\Delta\varepsilon_2}=\overline{\Delta\varepsilon_{cyclic}}-\overline{\Delta P_{eff}}\cdot\frac{2(1+V)}{3E},$$

where the $\overline{\Delta\varepsilon_{cyclic}}$ represents a corresponding cyclic strain range of the $\overline{\Delta P_{eff}}$, the $\overline{\Delta P_{eff}}$ represents effective primary stress, and $\overline{\Delta P_{eff}}=\Delta[P_m+0.67(P_b+P_L-P_m)]$.

In the above formula, the $P_m$ represents the general primary membrane stress, the $P_b$ represents the primary bending stress, and the $P_L$ represents the local primary membrane stress.

(3) The $\overline{\Delta\varepsilon_3}$ represents a local plastic strain range.

This value corresponds to the plastic strain range caused by local stress concentration, and is calculated according to a following formula: $\overline{\Delta\varepsilon_3}=(K_\varepsilon-1)\overline{(\Delta\varepsilon_1+\Delta\varepsilon_2)}$, where the $K_\varepsilon$ represents a strain concentration factor.

(4) The $\overline{\Delta\varepsilon_4}$represents a corrected Poisson's ratio strain range.

This value corresponds to a Poisson's ratio correction term for fatigue life analysis using an elastic analysis result, and is calculated according to a following formula: $\overline{\Delta\varepsilon_4}=(K_v-1)\overline{\Delta\varepsilon_1}$, where the $K_v$ represents a Poisson's ratio correction factor, and its value can be obtained by looking up a material property table.

The fatigue failure evaluation is performed based on the calculated strain change range.

Figure 2:
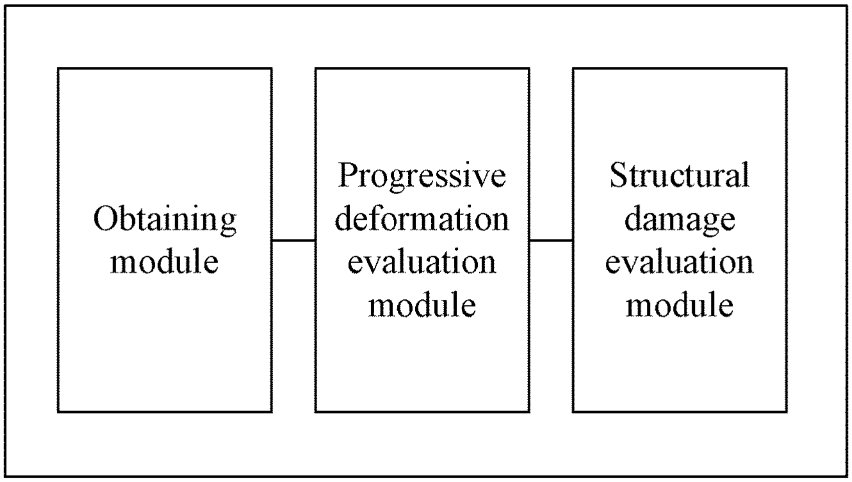
FIG. 2 is a schematic structural diagram of a device for evaluating damage caused by secondary stress to a vacuum vessel according to an embodiment of the present disclosure.

Another embodiment of the present disclosure provides a device for evaluating damage caused by secondary stress to a vacuum vessel. FIG. 2 is a schematic structural diagram of a device for evaluating damage caused by secondary stress to a vacuum vessel according to an embodiment of the present disclosure. The device includes an obtaining module, a progressive deformation evaluation module, and a structural damage evaluation module.

The obtaining module is configured to obtain secondary stress of a vacuum vessel that passes a primary-stress failure evaluation.

The progressive deformation evaluation module is configured to obtain structural damage parameters of the vacuum vessel when determining, based on evaluation parameters for the primary-stress failure evaluation of the vacuum vessel and the obtained secondary stress, that the vacuum vessel meets a precondition for a progressive deformation.

The structural damage evaluation module is configured to determine, based on the obtained structural damage parameters, whether the vacuum vessel meeting the precondition for the progressive deformation experiences structural damage due to the progressive deformation.

The device for evaluating damage caused by secondary stress to a vacuum vessel provided in this embodiment can perform all steps and functions of the method for evaluating damage caused by secondary stress to a vacuum vessel provided in any of the above embodiments. Specific functions of the device are not described herein.

Figure 3:
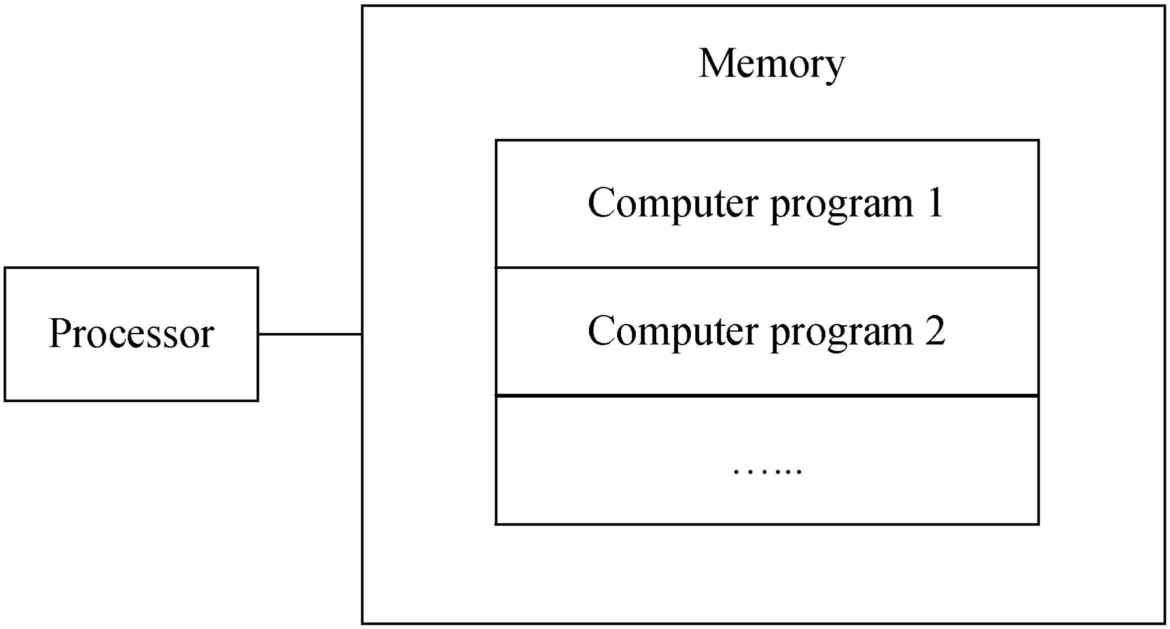
FIG. 3 is a schematic structural diagram of a terminal device according to an embodiment of the present disclosure.

FIG. 3 is a schematic structural diagram of a terminal device according to an embodiment of the present disclosure. The terminal device includes a processor, a memory, and a computer program stored in the memory and able to run on the processor, for example, a program for evaluating damage caused by secondary stress to a vacuum vessel. The processor executes the computer program to implement the steps in the above-mentioned embodiments of the method for evaluating damage caused by secondary stress to a vacuum vessel, for example, the steps S1 to S3 shown in FIG. 1. Alternatively, the processor executes the computer program to implement functions of the modules in the above-mentioned apparatus embodiments.

For example, the computer program may be divided into one or more modules. The one or more modules are stored in the memory and executed by the processor to complete the present disclosure. The one or more modules may be a series of computer program instruction segments capable of completing specific functions, and the instruction segments are used for describing an execution process of the computer program in the device for evaluating damage caused by secondary stress to a vacuum vessel. For example, the computer program may be divided into an obtaining module, a progressive deformation evaluation module, and a structural damage evaluation module. Specific functions of the modules have been described in detail in the method for evaluating damage caused by secondary stress to a vacuum vessel provided in any one of the above embodiments. Specific functions of the device are not described herein.

The device for evaluating damage caused by secondary stress to a vacuum vessel may be a computing device such as a desktop computer, a notebook, a palmtop computer, and a cloud server. The device for evaluating damage caused by secondary stress to a vacuum vessel may include, but is not limited to, a processor and a memory. A person skilled in the art may understand that the figure merely shows an example of the device for evaluating damage caused by secondary stress to a vacuum vessel, and does not limit the device for evaluating damage caused by secondary stress to a vacuum vessel. The device for evaluating damage caused by secondary stress to a vacuum vessel may include more or fewer components than those shown in the figure, or some components may be combined, or different components may be used. For example, the device for evaluating damage caused by secondary stress to a vacuum vessel may further include an input/output device, a network access device, a bus, and the like.

The processor may be a central processing unit (CPU), and may also be another general-purpose processor, a digital signal processor (DSP), an application specific integrated circuit (ASIC), a field-programmable gate array (FPGA) or another programmable logic device, a discrete gate, a transistor logic device, a discrete hardware component, etc. The general-purpose processor may be a microprocessor, or any conventional processor. The processor is a control center of the device for evaluating damage caused by secondary stress to a vacuum vessel, and various parts of the whole device for evaluating damage caused by secondary stress to a vacuum vessel are connected by using various interfaces and lines.

The memory may be configured to store the computer program and/or modules. By running or executing the computer program and/or modules stored in the memory and invoking data stored in the memory, the processor implements various functions of the device for evaluating damage caused by secondary stress to a vacuum vessel. The memory may mainly include a program storage area and a data storage area. The program storage area may store an operating system, an application program required by at least one function (such as a sound playing function and an image playing function), and the like. The data storage area may store data (such as audio data and an address book) created according to use of a mobile phone, and the like. In addition, the memory may include a high-speed random access memory, and may further include a non-volatile memory, such as a hard disk, an internal storage, a plug-in hard disk, a Smart Media Card (SMC), a Secure Digital (SD) card, a Flash Card, at least one magnetic disk storage device, a flash memory device, or another volatile solid-state storage device.

The module integrated in the device for evaluating damage caused by secondary stress to a vacuum vessel, if implemented in a form of a software functional unit and sold or used as a stand-alone product, may be stored in a computer-readable storage medium. Based on such an understanding, all or some of processes for implementing the methods in the foregoing embodiments can be completed by a computer program instructing relevant hardware. The computer program may be stored in a computer-readable storage medium. The computer program is executed by a processor to perform the steps of the foregoing method embodiments. The computer program includes computer program code, and the computer program code may be in a form of source code, a form of object code, an executable file or some intermediate forms, and the like. The computer-readable medium may include: any physical entity or apparatus capable of carrying computer program code, a recording medium, a USB disk, a mobile hard disk drive, a magnetic disk, an optical disc, a computer memory, a Read-Only Memory (ROM), a Random Access Memory (RAM), an electrical carrier signal, a telecommunications signal, a software distribution medium, and the like. It should be noted that, the content contained in the computer-readable medium may be added or deleted properly according to the legislation and the patent practice in the jurisdiction. For example, in some jurisdictions, depending on the legislation and the patent practice, the computer-readable medium may not include the electrical carrier signal or the telecommunications signal.

It should be noted that those of ordinary skill in the art may further make several improvements and modifications without departing from the principle of the present disclosure, but such improvements and modifications should be deemed as falling within the protection scope of the present disclosure.

The invention claimed is:

1. A method for evaluating damage caused by secondary stress to a vacuum vessel, wherein the vacuum vessel is a vacuum vessel of a nuclear fusion reactor, and the method comprises:

obtaining secondary stress of a vacuum vessel that passes a primary-stress failure evaluation;

obtaining structural damage parameters of the vacuum vessel when determining, based on evaluation parameters for the primary-stress failure evaluation of the vacuum vessel and the obtained secondary stress, that the vacuum vessel meets a precondition for a progressive deformation; and determining, based on the obtained structural damage parameters, whether the vacuum vessel meeting the precondition for the progressive deformation experiences structural damage due to the progressive deformation, and maintaining or replacing the vacuum vessel in response to that the vacuum vessel meeting the precondition for the progressive deformation experiences structural damage due to the progressive deformation;

wherein the obtaining structural damage parameters of the vacuum vessel when determining, based on evaluation parameters for the primary-stress failure evaluation of the vacuum vessel and the obtained secondary stress, that the vacuum vessel meets a precondition for a progressive deformation specifically comprises:

when Max $(P_L+P_b)+\Delta Q>3S_m$, determining that the vacuum vessel meets the precondition for the progressive deformation, and obtaining the structural damage parameters of the vacuum vessel, wherein the $P_L$ represents the local primary membrane stress on the vacuum vessel, the $P_b$ represents the primary bending stress on the vacuum vessel, the $S_m$ represents the preset allowable stress on the vacuum vessel, and the $\Delta Q$ represents the secondary stress on the vacuum vessel; the structural damage parameters comprise: an obtained material working temperature, calculated local plastic strain, a true strain value of an entire operating cycle of a Tokamak device, and a preset safety factor in elastic-plastic analysis;

wherein the determining, based on the obtained structural damage parameters, whether the vacuum vessel meeting the precondition for the progressive deformation experiences structural damage due to the progressive deformation specifically comprises:

when $\varepsilon_{pl} \leq \min[0.05, \lambda\varepsilon_{tr}]$, determining that the vacuum vessel does not experience the structural damage due to the progressive deformation; or when $\varepsilon_{pl} > \min[0.05, \lambda\varepsilon_{tr}]$, determining that the vacuum vessel experiences the structural damage due to the progressive deformation, wherein the true strain value of the entire operating cycle of the Tokamak device in the vacuum vessel is obtained according to a following formula:

$$\varepsilon_{tr} = \ln\frac{100}{100 - \%RA},$$

wherein the $\varepsilon_{pl}$ represents the local plastic strain of the vacuum vessel; the $\lambda$ represents the safety factor in the elastic-plastic analysis of the vacuum vessel; and a percentage of reduced cross-sectional area in a uniaxial test of the vacuum vessel is calculated according to a following formula: $\% \text{RA} = 71.8 - 4.34 \times 10^{-2}\text{T} - 6.47 \times 10^{-6}\text{T}^2$, wherein the T represents the material working temperature of the vacuum vessel.

2. The method for evaluating damage caused by secondary stress to a vacuum vessel according to claim 1, wherein a process of the primary-stress failure evaluation specifically comprises:

obtaining preset allowable stress, and detecting general primary membrane stress, local primary membrane stress, and primary bending stress on the vacuum vessel as the evaluation parameters for the primary-stress failure evaluation;

determining whether the general primary membrane stress is greater than the allowable stress, and determining whether a sum of the local primary membrane stress and the primary bending stress is greater than a product of the allowable stress and a preset first threshold; and when the general primary membrane stress is not greater than the allowable stress, and the sum of the local primary membrane stress and the primary bending stress is not greater than the product of the allowable stress and the first threshold, determining that the vacuum vessel passes the primary-stress failure evaluation; or when the general primary membrane stress is greater than the allowable stress, or the sum of the local primary membrane stress and the primary bending stress is greater than the product of the allowable stress and the first threshold, determining that the vacuum vessel does not pass the primary-stress failure evaluation.

3. The method for evaluating damage caused by secondary stress to a vacuum vessel according to claim 1, further comprising:

obtaining a material strain-fatigue life curve corresponding to a material of the vacuum vessel by querying a preset database based on the material of the vacuum vessel, wherein the database comprises a one-to-one correspondence between each material and a material strain-fatigue life curve;

calculating a strain range parameter of the vacuum vessel to determine a strain change range of the vacuum vessel, and comparing the strain change range and the material strain-fatigue life curve to determine a fatigue life of the vacuum vessel; and obtaining an actual quantity of operating times of the vacuum vessel, and when a ratio of the fatigue life of the vacuum vessel to the actual quantity of operating times is greater than a preset second threshold, determining that a fatigue failure occurs on the vacuum vessel.

4. The method for evaluating damage caused by secondary stress to a vacuum vessel according to claim 3, wherein the strain change range is calculated according to a following formula: $\Delta\varepsilon = \Delta\varepsilon_1 + \Delta\varepsilon_2 + \Delta\varepsilon_3 + \Delta\varepsilon_4$, wherein the $\Delta\varepsilon_1$ represents an elastic term, and may be obtained from elastic total stress, the $\Delta\varepsilon_2$ represents a plastic increase due to a primary stress range at a point examined, the $\Delta\varepsilon_3$ represents intersection of the Neuber hyperbola (points of constant work per volume unit), and the $\Delta\varepsilon_4$ represents a plastic increase due to triaxiality.

5. A terminal device, comprising a processor, a memory, and a computer program stored in the memory and configured to be executed by the processor, wherein the processor executes the computer program to implement the method for evaluating damage caused by secondary stress to a vacuum vessel according to claim 1.

6. The terminal device according to claim 5, wherein a process of the primary-stress failure evaluation specifically comprises:

obtaining preset allowable stress, and detecting general primary membrane stress, local primary membrane stress, and primary bending stress on the vacuum vessel as the evaluation parameters for the primary-stress failure evaluation;

determining whether the general primary membrane stress is greater than the allowable stress, and determining whether a sum of the local primary membrane stress and the primary bending stress is greater than a product of the allowable stress and a preset first threshold; and when the general primary membrane stress is not greater than the allowable stress, and the sum of the local primary membrane stress and the primary bending stress is not greater than the product of the allowable stress and the first threshold, determining that the vacuum vessel passes the primary-stress failure evaluation; or when the general primary membrane stress is greater than the allowable stress, or the sum of the local primary membrane stress and the primary bending stress is greater than the product of the allowable stress and the first threshold, determining that the vacuum vessel does not pass the primary-stress failure evaluation.

7. The terminal device according to claim 5, wherein the terminal device is further configured to:

obtain a material strain-fatigue life curve corresponding to a material of the vacuum vessel by querying a preset database based on the material of the vacuum vessel, wherein the database comprises a one-to-one correspondence between each material and a material strain-fatigue life curve;

calculate a strain range parameter of the vacuum vessel to determine a strain change range of the vacuum vessel, and compare the strain change range and the material strain-fatigue life curve to determine a fatigue life of the vacuum vessel; and obtain an actual quantity of operating times of the vacuum vessel, and when a ratio of the fatigue life of the vacuum vessel to the actual quantity of operating times is greater than a preset second threshold, determine that a fatigue failure occurs on the vacuum vessel.

8. The terminal device according to claim 7, wherein the strain change range is calculated according to a following formula: $\Delta\varepsilon=\Delta\varepsilon_1+\Delta\varepsilon_2+\Delta\varepsilon_3+\Delta\varepsilon_4$, wherein the $\Delta\varepsilon_1$ represents an elastic term, and may be obtained from elastic total stress, the $\Delta\varepsilon_2$ represents a plastic increase due to a primary stress range at a point examined, the $\Delta\varepsilon_3$ represents intersection of the Neuber hyperbola, and the $\Delta\varepsilon_4$ represents a plastic increase due to triaxiality.

9. A computer-readable storage medium, wherein the computer-readable storage medium comprises a stored computer program, and the computer program is run to control a device on which the computer-readable storage medium is located to perform the method for evaluating damage caused by secondary stress to a vacuum vessel according to claim 1.

10. The computer-readable storage medium according to claim 9, wherein a process of the primary-stress failure evaluation specifically comprises:

obtaining preset allowable stress, and detecting general primary membrane stress, local primary membrane stress, and primary bending stress on the vacuum vessel as the evaluation parameters for the primary-stress failure evaluation;

determining whether the general primary membrane stress is greater than the allowable stress, and determining whether a sum of the local primary membrane stress and the primary bending stress is greater than a product of the allowable stress and a preset first threshold; and when the general primary membrane stress is not greater than the allowable stress, and the sum of the local primary membrane stress and the primary bending stress is not greater than the product of the allowable stress and the first threshold, determining that the vacuum vessel passes the primary-stress failure evaluation; or when the general primary membrane stress is greater than the allowable stress, or the sum of the local primary membrane stress and the primary bending stress is greater than the product of the allowable stress and the first threshold, determining that the vacuum vessel does not pass the primary-stress failure evaluation.

11. A device for evaluating damage caused by secondary stress to a vacuum vessel, wherein the vacuum vessel is a vacuum vessel of a nuclear fusion reactor, and the device comprises:

an obtaining module configured to obtain secondary stress of a vacuum vessel that passes a primary-stress failure evaluation;

a progressive deformation evaluation module configured to obtain structural damage parameters of the vacuum vessel when determining, based on evaluation parameters for the primary-stress failure evaluation of the vacuum vessel and the obtained secondary stress, that the vacuum vessel meets a precondition for a progressive deformation; and a structural damage evaluation module configured to determine, based on the obtained structural damage parameters, whether the vacuum vessel meeting the precondition for the progressive deformation experiences structural damage due to the progressive deformation, and maintain or replace the vacuum vessel in response to that the vacuum vessel meeting the precondition for the progressive deformation experiences structural damage due to the progressive deformation;

wherein the progressive deformation evaluation module is configured to:

when $\text{Max}(P_L+P_b)+\Delta Q>3S_m$, determine that the vacuum vessel meets the precondition for the progressive deformation, and obtain the structural damage parameters of the vacuum vessel, wherein the $P_L$ represents the local primary membrane stress on the vacuum vessel, the $P_b$ represents the primary bending stress on the vacuum vessel, the $S_m$ represents the preset allowable stress on the vacuum vessel, and the $\Delta Q$ represents the secondary stress on the vacuum vessel; the structural damage parameters comprise: an obtained material working temperature, calculated local plastic strain, a true strain value of an entire operating cycle of a Tokamak device, and a preset safety factor in elastic-plastic analysis;

wherein the structural damage evaluation module is configured to:

when $\varepsilon_{pl}\leq\min[0.05,\lambda\varepsilon_{tr}]$, determine that the vacuum vessel does not experience the structural damage due to the progressive deformation; or when $\varepsilon_{pl}>\min[0.05,\lambda\varepsilon_{tr}]$, determine that the vacuum vessel experiences the structural damage due to the progressive deformation, wherein the true strain value of the entire operating cycle of the Tokamak device in the vacuum vessel is obtained according to a following formula:

$$\varepsilon_{tr}=\ln\frac{100}{100-\%RA},$$

wherein the $\varepsilon_{pl}$ represents the local plastic strain of the vacuum vessel; the $\lambda$ represents the safety factor in the elastic-plastic analysis of the vacuum vessel; and a percentage of reduced cross-sectional area in a uniaxial test of the vacuum vessel is calculated according to a following formula: $\%\ RA=71.8-4.34\times10^{-2}T-6.47\times10^{-6}T^2$, wherein the T represents the material working temperature of the vacuum vessel.

* * * * *